United States Patent
Lewis et al.

(10) Patent No.: US 9,189,801 B2
(45) Date of Patent: Nov. 17, 2015

(54) SYSTEM AND METHOD FOR REWARDING APPLICATION INSTALLS

(75) Inventors: Benjamin Lewis, San Francisco, CA (US); Lee Linden, San Francisco, CA (US); Stephen McCarthy, San Francisco, CA (US); Ryan Johns, San Francisco, CA (US)

(73) Assignee: Tapjoy, Inc., San Francisco, CA (US)

( * ) Notice: Subject to any disclaimer, the term of this patent is extended or adjusted under 35 U.S.C. 154(b) by 105 days.

(21) Appl. No.: 13/106,051

(22) Filed: May 12, 2011

(65) Prior Publication Data

US 2012/0035990 A1 Feb. 9, 2012

Related U.S. Application Data

(60) Provisional application No. 61/371,500, filed on Aug. 6, 2010.

(51) Int. Cl.
| | | |
|---|---|---|
| G06Q 30/02 | (2012.01) | |
| H04W 4/00 | (2009.01) | |
| H04W 4/20 | (2009.01) | |
| G06F 9/445 | (2006.01) | |

(52) U.S. Cl.
CPC ........ G06Q 30/0207 (2013.01); G06Q 30/0239 (2013.01); H04W 4/003 (2013.01); H04W 4/206 (2013.01); G06F 8/61 (2013.01)

(58) Field of Classification Search
CPC ................................................ G06Q 30/0207
See application file for complete search history.

(56) References Cited

U.S. PATENT DOCUMENTS

| | | | |
|---|---|---|---|
| 6,594,691 B1 | 7/2003 | McCollum et al. | |
| 7,269,636 B2 | 9/2007 | McCollum et al. | |
| 7,647,252 B2 | 1/2010 | Rampell et al. | |
| 7,698,171 B2 | 4/2010 | Rampell et al. | |
| 7,783,721 B2 | 8/2010 | McCollum et al. | |
| 7,788,139 B2 | 8/2010 | Rampell et al. | |
| 7,848,960 B2 | 12/2010 | Rampell et al. | |
| 8,065,702 B2 | 11/2011 | Goldberg et al. | |
| 2001/0034712 A1* | 10/2001 | Colvin ............................ | 705/52 |
| 2002/0002488 A1 | 1/2002 | Muyres et al. | |
| 2002/0004742 A1* | 1/2002 | Willcocks et al. .............. | 705/14 |
| 2002/0077986 A1* | 6/2002 | Kobata et al. ................... | 705/52 |

(Continued)

FOREIGN PATENT DOCUMENTS

| | | |
|---|---|---|
| KR | 10-2007-0022397 A | 2/2007 |
| TW | 200910232 A | 3/2009 |

OTHER PUBLICATIONS

Wikipedia article titled "Ping (networking utility)," downloaded on Feb. 15, 2013.*

(Continued)

*Primary Examiner* — Jacob C. Coppola
(74) *Attorney, Agent, or Firm* — Hickman Palermo Becker Bingham LLP

(57) ABSTRACT

In a system and method for monitoring application installations, a reference to download an application is transmitted to a client device. Communication between the client device and an application server providing the application downloadable by the client device is facilitated. Execution of the application by the client device is detected, and a determination of the installation history of the application on the client device is performed. Reward data is associated with the client device for a first installation of the application on the client device.

18 Claims, 7 Drawing Sheets

(56) References Cited

U.S. PATENT DOCUMENTS

| | | |
|---|---|---|
| 2002/0095333 A1 | 7/2002 | Jokinen et al. |
| 2002/0128057 A1 | 9/2002 | Walker et al. |
| 2002/0147639 A1* | 10/2002 | Williams et al. ............... 705/14 |
| 2002/0194064 A1* | 12/2002 | Parry et al. ...................... 705/14 |
| 2002/0198851 A1 | 12/2002 | Hashimoto et al. |
| 2003/0032476 A1* | 2/2003 | Walker et al. .................. 463/25 |
| 2003/0084439 A1* | 5/2003 | Perkins et al. ................ 717/177 |
| 2003/0120542 A1* | 6/2003 | Arning ............................ 705/14 |
| 2003/0181242 A1* | 9/2003 | Lee et al. ........................ 463/42 |
| 2004/0190448 A1* | 9/2004 | Fishteyn et al. .............. 370/229 |
| 2005/0289047 A1 | 12/2005 | Oliver et al. |
| 2006/0004799 A1* | 1/2006 | Wallender .................... 707/100 |
| 2007/0005428 A1 | 1/2007 | Jacobs et al. |
| 2007/0174115 A1 | 7/2007 | Chieu et al. |
| 2007/0255576 A1* | 11/2007 | Patterson .......................... 705/1 |
| 2008/0070690 A1 | 3/2008 | Van Luchene et al. |
| 2008/0077506 A1 | 3/2008 | Rampell et al. |
| 2008/0091528 A1 | 4/2008 | Rampell et al. |
| 2008/0162371 A1 | 7/2008 | Rampell et al. |
| 2008/0215438 A1 | 9/2008 | Muthugopalakrishnan et al. |
| 2008/0275786 A1 | 11/2008 | Gluck |
| 2009/0216861 A1 | 8/2009 | Shiely et al. |
| 2009/0292599 A1 | 11/2009 | Rampell et al. |
| 2010/0205274 A1 | 8/2010 | Gharabally et al. |
| 2010/0211431 A1* | 8/2010 | Lutnick et al. .................. 705/10 |
| 2010/0262506 A1 | 10/2010 | Zargahi et al. |
| 2010/0318611 A1 | 12/2010 | Curtin et al. |
| 2010/0324983 A1* | 12/2010 | Etchegoyen ............... 705/14.23 |
| 2011/0055413 A1* | 3/2011 | Lobsenz ....................... 709/231 |
| 2011/0131089 A1 | 6/2011 | Walker et al. |
| 2011/0161150 A1 | 6/2011 | Steffens et al. |
| 2011/0202928 A1 | 8/2011 | Nakano et al. |
| 2011/0208616 A1 | 8/2011 | Gorman et al. |
| 2011/0300923 A1* | 12/2011 | Van Luchene .................. 463/25 |
| 2011/0320307 A1 | 12/2011 | Mehta et al. |
| 2012/0035990 A1* | 2/2012 | Lewis et al. ................... 705/14.1 |
| 2012/0036003 A1* | 2/2012 | Tong et al. .................. 705/14.39 |
| 2012/0197716 A1 | 8/2012 | Rampell et al. |
| 2012/0197717 A1 | 8/2012 | Rampell et al. |
| 2012/0197730 A1 | 8/2012 | Rampell et al. |
| 2012/0197731 A1 | 8/2012 | Rampell et al. |
| 2012/0209668 A1 | 8/2012 | Angelos et al. |
| 2012/0209908 A1 | 8/2012 | Angelos et al. |
| 2012/0265595 A1 | 10/2012 | Corner et al. |
| 2012/0265602 A1 | 10/2012 | Corner et al. |
| 2012/0265603 A1 | 10/2012 | Corner et al. |
| 2012/0265604 A1* | 10/2012 | Corner et al. .............. 705/14.39 |
| 2013/0035994 A1 | 2/2013 | Pattan et al. |
| 2013/0185133 A1 | 7/2013 | Tong et al. |

OTHER PUBLICATIONS

International Searching Authority, "Search Report and Written Opinion", in application No. PCT/US11/36209, Applicant Tapjoy Inc., dated Aug. 18, 2011, 7 pages.

Current Claims in application No. PCT/US11/36209, dated Aug. 2011, 6 pages.

"International Application Serial No. PCT/US2011/036209, International Search Report mailed Aug. 18, 2011", 2 pgs.

"International Application Serial No. PCT/US2011/036209, Written Opinion mailed Aug. 18, 2011", 4 pgs.

European Patent Office, "Search Report" in application No. 11815356.8 1955, dated Mar. 12, 2014, 6 pages.

European Patent Office, "Search Report" in application No. 11814933.5-1955, dated Mar. 12, 2014, 6 pages.

Current Claims in application No. 11814933.5, dated Mar. 2014, 4 pages.

Current Claims in applicatio No. 11815356.8-1955, dated Mar. 2014, 4 pages.

Claims in Canadian Application No. 2,807,473, dated Oct. 2014, 4 pages.

Canadian Intellectual Property Office, "Office Action" in application No. 2,807,473, dated Oct. 2, 2014, 3 pages.

Taiwan Patent Office, "Office Action" in application No. 102101385, dated Dec. 17, 2014, 8 pages.

Claims in Tawian Application No. 102101385, dated Dec. 2014, 3 pages.

Claims in Canadian case 2,807,481 dated Feb. 2015, 6 pages.

Canadian Intellectual Property Office, "Office Action" in application No. 2,807,481, dated Feb. 12, 2015, 3 pages.

European Patent Office, "Search Report" in application No. PCT/US2013/020163 dated Apr. 29, 2013, 9 pages.

Current Claims in application No. PCT/US2013/020163, dated Apr. 2013, 3 pages.

European Patent Office, "Search Report" in application No. 13736324.8—1955, dated Aug. 4, 2015, 7 pages.

European Claims in application No. 13736324.8-1955, dated Aug. 2015, 3 pages.

\* cited by examiner

SYSTEM AND METHOD FOR REWARDING APPLICATION INSTALLS

CROSS REFERENCE TO RELATED APPLICATIONS

This application claims priority under 35 U.S.C. §119 to U.S. Provisional Patent Application No. 61/371,500, filed Aug. 6, 2010, and entitled "SYSTEM AND METHOD FOR REWARDING APPLICATION INSTALLS," which application is incorporated by reference herein in its entirety.

TECHNICAL FIELD

Example embodiments of the present application generally relate to the field of monitoring online user actions, and more specifically, but not by way of limitation, to techniques for detecting the installation of applications.

BACKGROUND

Online advertising models generally involve the delivery of advertisements or offers to users over one or more advertising channels. The effectiveness of advertisements, however, varies, depending on the type of advertisement and the channel used to deliver the advertisement. In particular, one reason a user may ignore an advertisement is that there is no incentive for the user to follow the advertisement.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice embodiments disclosed herein. It will be apparent to one skilled in the art that specific details in the example embodiments are not required in order to practice the embodiments disclosed herein. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In a client environment, applications may be offered for download at a centralized site, such as an application store ("app store"). Applications in the app store may be listed by a variety of metrics, such as by category, popularity, and cost. As concerns applications provided for download in an app store, a publisher shall refer to the entity that publishes or otherwise provides an application for download by users. An advertiser shall refer to an entity that provides an offer, usually in the form of an action to be taken by the user.

Figure 1:
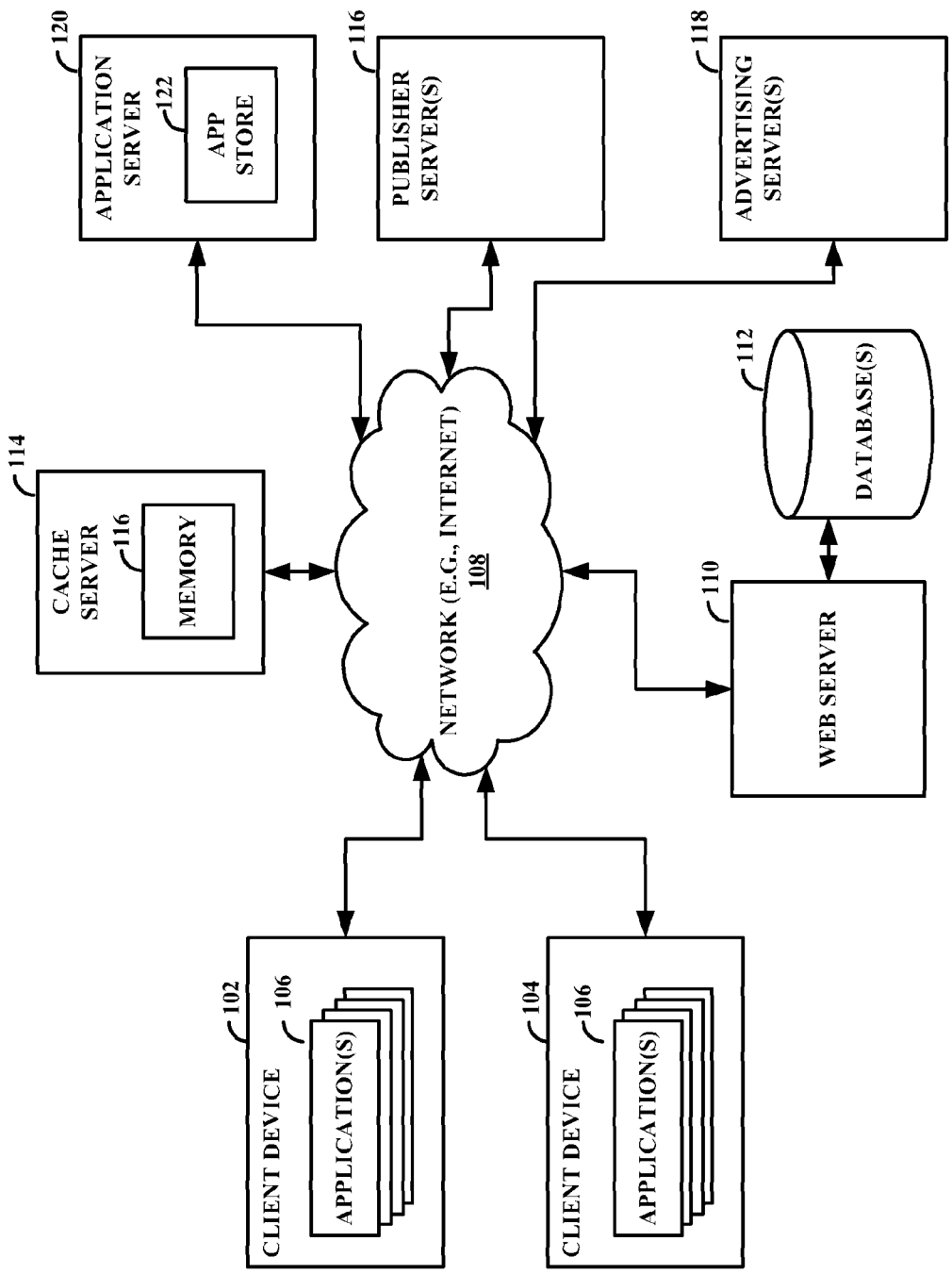
FIG. 1 is a block diagram illustrating an example embodiment of a networked environment within which a client device connects, via a network, with an application server, while a referral system monitors the connection.

FIG. 1 is a block diagram illustrating an example embodiment of a networked environment in which a client device connects, via a network, to an application server hosting an application store. Referring to FIG. 1, a client device 102 and a client device 104, each storing one or more applications 106, may connect via a network 108, such as the Internet, to an application server 120 executing an application store 122. In some embodiments, the client device 102 and the client device 104 may be mobile devices, personal computers, tablet computers, laptop computers, or other computing devices. Client device 102 and client device 104 may be re-directed to the app store 122 to download application(s) via the network 108.

Web server 110 may host a website for a client application platform that connects advertisers and publishers. Web server 110 may provide various hosted web services to the website, including code deployment and testing, online analytics, data storage, and task management. Web server 110 may be connected to one or more databases 112 that store data associated with the website, among other things. In some embodiments, web server 110 may be an Amazon.com®-hosted web server providing web services. However, it is contemplated that different third party hosted providers of web services may be used, or servers associated with the website may provide web services without resort to third party-provided web services. Additional web servers (not shown) may include servers associated with the hosted website.

In some embodiments, the one or more databases 112 may be SimpleDB distributed databases. SimpleDB distributed databases use a key-value pair to enable fast lookup and retrieval operations as compared to structured query language (SQL) databases. It is contemplated that other databases may be used, such as other databases employing key-value pairs to store and index data. In some embodiments, at least one of the databases 112 may be a SQL database. Data associated with the website, such as user data and application tracking data, also may be stored in cache server 114. Cache server 114 may include memory 116, in the form of RAM, for example, that stores part or all of the data stored in database(s) 112. Cache server 114 may operate as a backup or supplemental data store for the website. In some embodiments, cache server 114 may be a Memcached distributed memory caching system. Publisher server 118 may either serve as the source of applications downloaded to a client device 102 or client device 104 or provide the applications to the application server 120 for storage and listing in the app store 122. Similarly, advertiser server 118 may provide and deliver advertisements to client device 102 or client device 104 on behalf of advertisers or advertising networks, or may provide advertisements via the network 108 to the application server 120 for the application server 120 to deliver.

Figure 2:
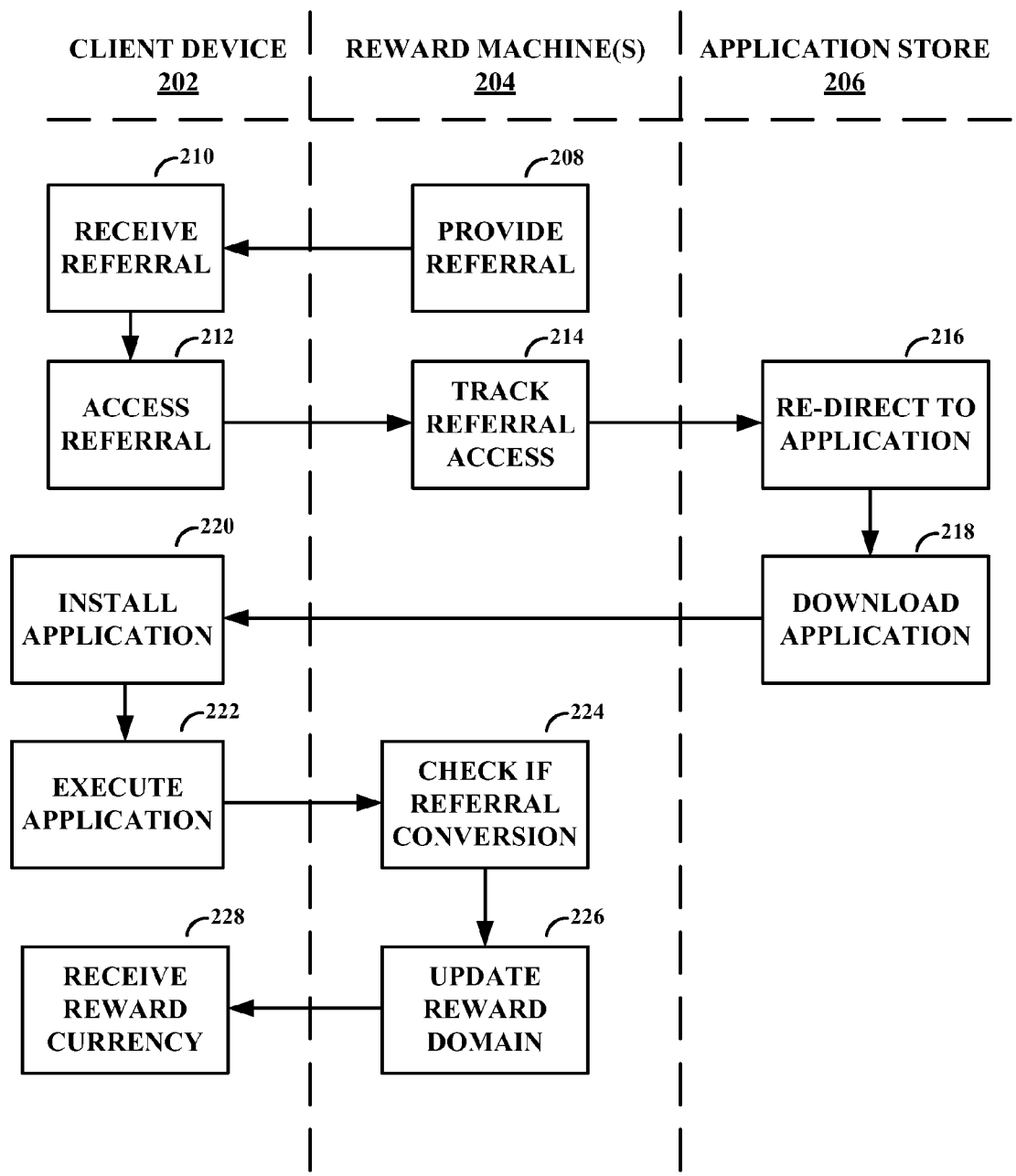
FIG. 2 is a flow diagram illustrating an example interaction between a client device, a reward system, and an application store, in accordance with an example embodiment.

FIG. 2 is a flow diagram illustrating example interaction between a client device, a reward system, and an application store, in accordance with an example embodiment. Referring to FIG. 2, when an application using or associated with the website ad platform executes, a call is made to the reward system. The reward system or platform may comprise a website, one or more web servers providing web services, and one or more data storage devices, either distributed and accessible via the network 108 or connected to the one or more web servers. The call may be in the form of a ping or push communication initiated by software code in the application. The ping is pushed to the reward system. In some embodiments, the ping may be pushed to the reward system via one or more servers. In other embodiments, the ping may be pushed to the reward system directly.

At block 208, a reward machine 204 associated with the reward platform may deliver an advertisement to the client device 202 executing the application. The reward platform may track the display of the advertisement so that the platform may record the advertisement impression. At block 210, the client device 202 may receive the advertisement. The advertisement may be an offer or a referral related to the application being executed on the client device 202. In one example embodiment, the referral offer may prompt the user to download a different application in exchange for a reward or incentive. In an example embodiment, the reward or incentive may be virtual currency or a virtual good for use with the executing application. The virtual currency may be used to purchase virtual or actual goods associated with the executing application. At block 212, the client device 202 accesses the referral, such as by selecting a reference to the referred application or clicking a URL or hyperlink. In some embodiments, the referral may direct the user to the app store 206, and in some embodiments, to the referred application in the app store 206.

At block 214, when the user clicks on the referral, the referral is directed to the reward platform, where it is tracked and stored. In some embodiments, the unique device identifier ("Udid") for the client device that accessed the referral is stored. In some embodiments, an application identifier ("AppID") associated with the referred application also is stored. It is contemplated that other identification information may be stored as well, including an Internet Protocol ("IP") address of the client device, a Media Access Control ("MAC") address of the client device, or an account identifier, such as a client device account identifier (e.g., a telephone number) or a third party account identifier (e.g., Facebook® username, Apple® account identifier, Google® account identifier). Once stored, the reward platform may redirect the user to the app store 206.

At block 216, the client device may be re-directed to the referred application in the app store 206. At block 218, the referred application may be downloaded from the app store 206 to the client device 202. At block 220, the client device 202 may install the referred application. In an example embodiment, reward machine(s) 204 may have no knowledge of whether the client device 202 actually downloaded the referred application from the app store 206 because the reward platform may not have access to the mechanisms and inner workings of the app store 206.

At block 222, the client device 202 may execute the installed application. A script or other code included in the referred application by the reward machine(s) 204 or by an advertiser may trigger the referred application to ping or otherwise push data to the reward machine(s) 204. The ping may indicate to the reward machine(s) 204 that the device, as identified by its Udid, has executed the referred application.

At block 224, the reward machine(s) 204 may verify whether a referral conversion has occurred. In some embodiments, a referral conversion (e.g., an installation of a referred application) is verified by searching a table of stored clicks using the Udid of the device executing the application and the AppID of the application being executed. In some embodiments, the referral conversion may be verified by searching a table of stored clicks using other device or account identifiers (e.g., IP address, MAC address, third party account identifiers). The stored clicks table may store an installation history for every application downloaded by a client device, in addition to other data, such as a date of execution or access. If the search of the stored clicks table shows that the user recently clicked to the application within a predetermined amount of time and the user has not previously installed the application, the execution of the application is considered a conversion.

At block 226, if a conversion is determined to have occurred, a rewards domain of the reward machine(s) 204 is updated. The rewards domain tracks all rewards in the system. At block 228, the rewards machine(s) 204 may associate reward data with the client device 202 or an account associated with a user of the client device 202 and may transmit the reward data to the user account or the client device 202. The rewards machine(s) 204 may call a software method or command to transmit the reward to the user. In some embodiments, the rewards machine(s) 204 may push the reward to the user account or client device 202. In some embodiments, a user of the client device 202 may retrieve the reward from the rewards machine(s) 204. The reward may be virtual currency or a virtual good for use within the referring application.

Figure 3:
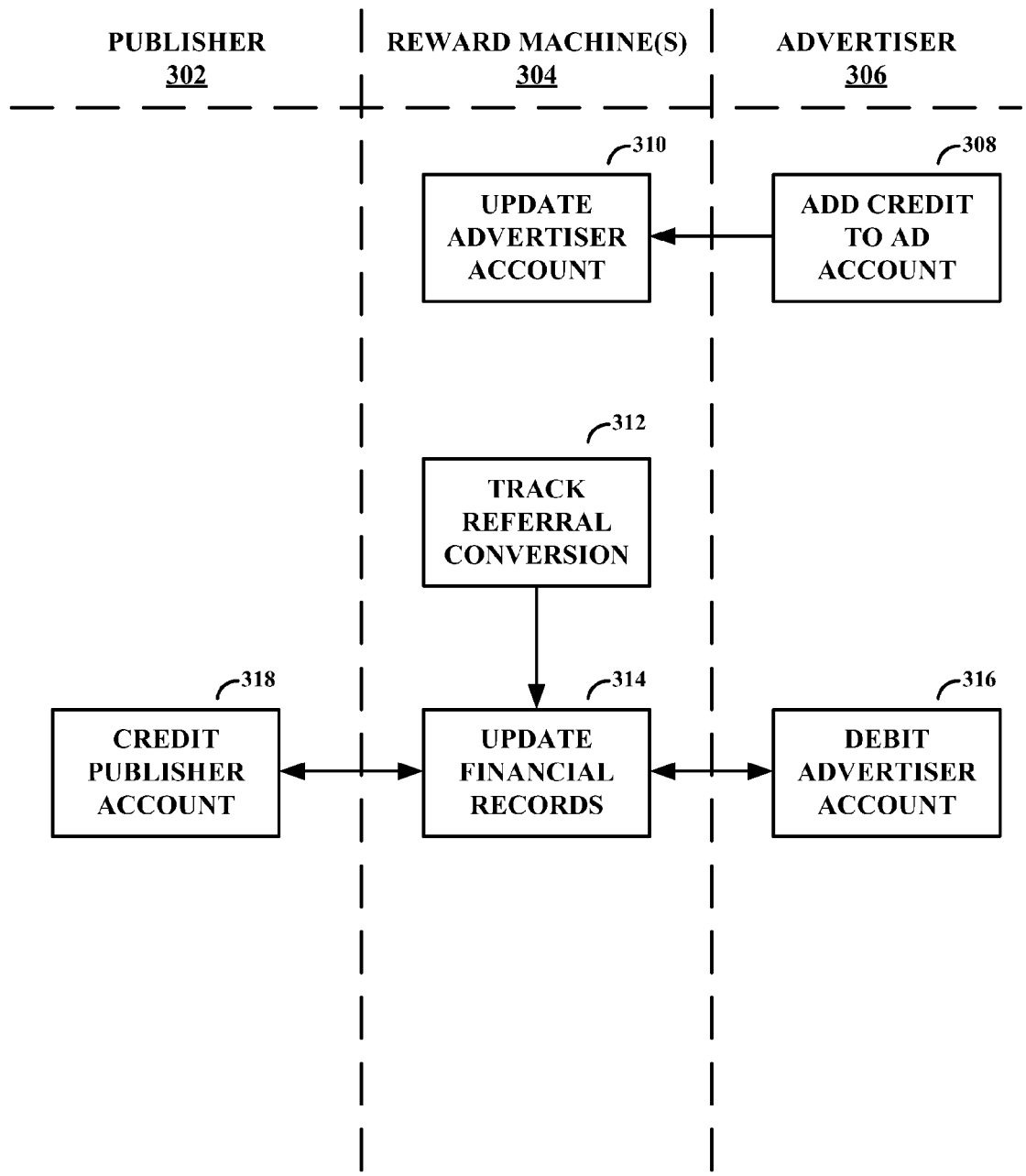
FIG. 3 is a flow diagram illustrating an example interaction between a reward system, an advertiser, and a publisher in response to a user action, in accordance with an example embodiment.

FIG. 3 is a block diagram illustrating an example interaction between a reward system, an advertiser, and a publisher in response to a user action, according to some embodiments. At block 308, an advertiser seeking to market an application to users of the reward system platform adds credits to their account. The credits may instruct the platform as to how much the advertiser 306 is willing to pay per application installation. At block 310, reward machine(s) 304 associated with the platform (or reward website) may update an account associated with the advertiser 306. Account data may be stored in a database or lookup table.

At block 312, the reward platform tracks and verifies a referral conversion. A referral conversion may comprise the installation of an application referred by the advertiser 306. When a user clicks on a referral, that click and accompanying data, including but not limited to the client device's Udid and IP address, are stored. In some embodiments, other device or account identifiers (e.g., MAC address, third party account identifiers) may be stored. Because the reward platform may not have access to the inner workings of an app store or other third party application repository, a referral conversion is verified by detecting execution of the referred application by the client device. The application may push data to the reward platform indicating that the client device has executed the referred application.

If a referral conversion has occurred, at block 314, financial records are updated on the rewards platform. In an example embodiment, a software method "send_money_txn" may be called to send transaction data to web server 110 (of FIG. 1).

It is contemplated that the name of the software method used to send transaction data to web server 110 is immaterial; other software methods may be invoked to send the transaction data to the web server 110. Web server 110 may insert the transaction into a database table that stores application transactions. A script may execute on a periodic basis to perform a SUM operation over the table. In an example embodiment, the script may execute every minute. The script may debit an advertiser 306 account at block 316. The script also may credit a publisher 302 account at block 318. In an example embodiment, blocks 314, 316, and 318 may be performed for each detected application installation.

Note that FIG. 3 shows blocks 312, 314, 316, and 318 are not connected to the other blocks. This illustrates that operations associated with these blocks may be performed independent of the other operations, according to some embodiments.

Figure 4:
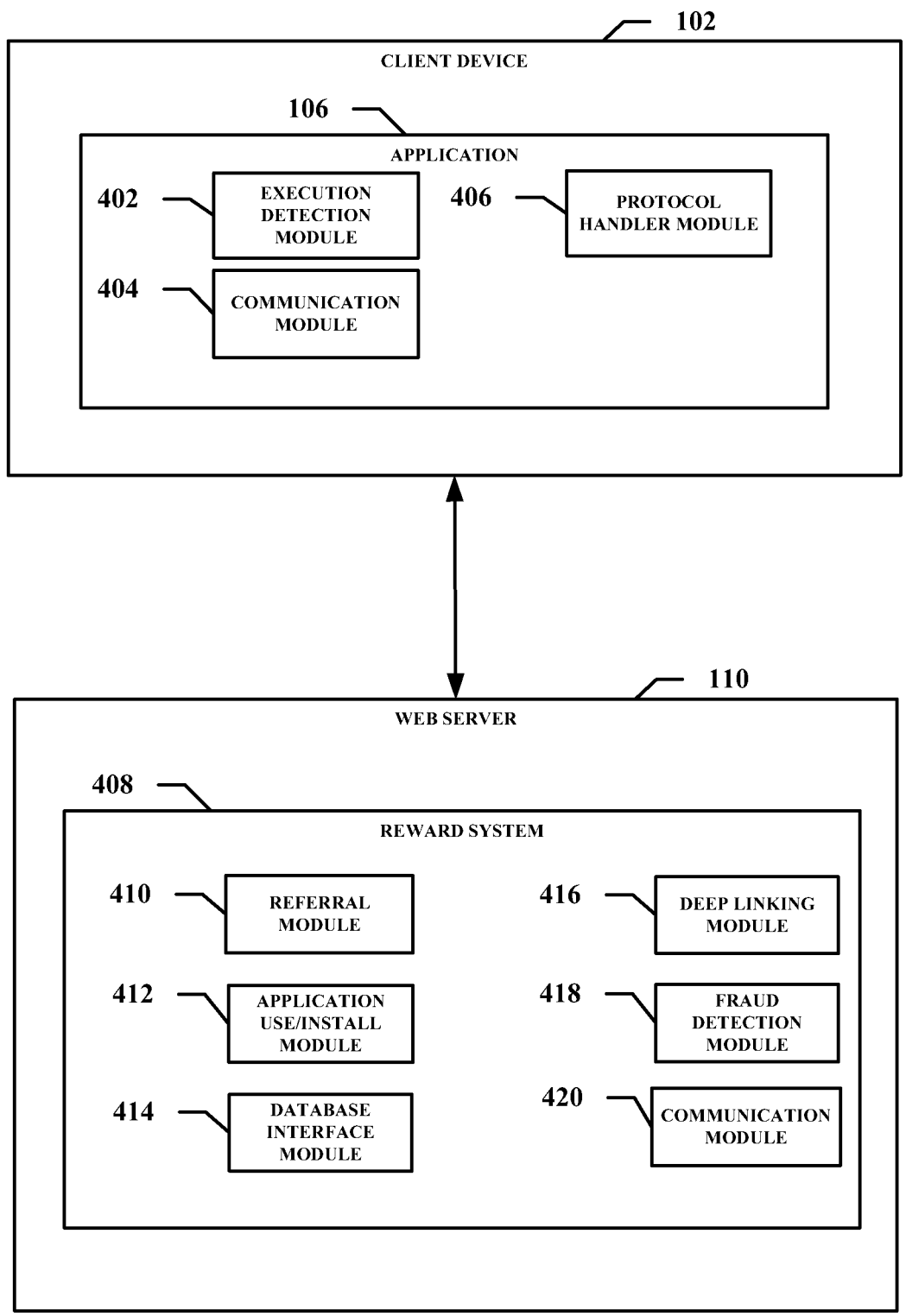
FIG. 4 is a block diagram showing modules of an application, running on a client device, and modules of a reward system, running on a server, in accordance with an example embodiment.

FIG. 4 is a block diagram showing modules of an application, running on a client device 102, and modules of a reward system 408, running on a web server 110, in accordance with an example embodiment. The application 106 may include an execution detection module 402, a communication module 404, and a protocol handler module 406.

Execution detection module 402 may detect when the application 106 is executed. In an example embodiment, execution detection module 402 may be inserted into application 106 by the reward system 408 or an advertiser to track execution of the application 106. In addition to tracking execution of the application 106, execution detection module 402 may track application usage data, including user interaction with the application 106, duration of use, and use of virtual goods or currency, among other things.

Communication module 404 may transmit and receive data to and from the application 106. Communication module 404 may operate in conjunction with execution detection module 402 to push data, for example, a ping, to the reward system 408 upon execution of the application 106. Communication module 404 also may receive referral offers from the reward system 408 and may transmit acceptance of a referral offer, along with identifying information about the application 106 and the client device 102.

Protocol handler module 406 may register a protocol handler for use on the client device 102. The protocol handler module 406 may register the protocol handler on behalf of a publisher of an application 106. The reward system 408 may cooperate with the publisher of the application 106 to use the protocol handler to gain access to the application 106. The reward system 408 may transmit code via communication module 404 to the client device 102 and use the exposed protocol handler to insert the code in the application 106. The code may enable the reward system 408 to offer incentives to users for targeted pay-per-action events. Examples of targeted pay-per-action events may include but are not limited to logging in or checking in to an application account, watching videos, taking surveys, and accessing particular advertisements. Protocol handler module 406 may operate in conjunction with execution detection module 402 to detect when a user performs a pay-per-action event. In response to a pay-per-action event, the execution detection module 402 may generate a ping or initiate a data push to notify the reward system 408 that the user has engaged in a pay-per-action event.

The reward system 408 includes a referral tracking module 410, an application use/install module 412, a database interface module 414, a deep linking module 416, a fraud detection module 418, and a communication module 420.

The referral module 410 may select and generate referral offers to be transmitted to the client device 102. In an example embodiment, the referral offer is a list of offers optimized for the application being executed. The list of offers may comprise a list of applications incentivized for download by the user, with the incentive being virtual currency or a virtual good. The list of offers may be compared to a list of disabled offers stored on a per application basis to determine which offers should be culled from the offer list. The referral tracking module 410 may use advertisements from a variety of advertising networks. The referral tracking module 410 may select an advertisement to be offered to the user, with different advertisements being offered depending on the application 106 being executed by the client device 102. The advertisement offered as a referral may be chosen for delivery using an ad order algorithm that optimizes advertisements to be delivered by one or more predetermined metrics. In some embodiments, the effective cost per mille for each advertisement may be considered in determining which advertisement to deliver.

The application use/install module 412 may monitor and track application usage and installation. The application use/install module 412 may store the client device 102's Udid whenever a referral sends a user to the app store for a specific application that the client device 102 has not previously run. The client device 102's Udid may be stored with application identifiers corresponding to every application executed by the client device 102. The Udid may serve as a key to enable a fast lookup whenever a client device executes an application. In this respect, the reward system may use the Udid to look up a list of every application executed by the client device 102 to determine whether an executed application is a newly installed application. In some embodiments, other identifiers (e.g., IP address, MAC address, third party account identifiers) may be used to track a client device's application installation history.

Similarly, the application use/install module 412 may store the Udid and AppID as a key in a store click table whenever a user clicks to an app store to download an application. The store click table may be referenced by the application use/install module 412 when the module 412 is attempting to determine whether an executing application was recently downloaded and is a new installation.

The database interface module 414 may interface with connected and distributed databases to store and retrieve application and user data. In an example embodiment, the database interface module 414 may interface with databases or data storage devices to access an installation history for applications on a per client device basis. For example, the reward system 408 may use both SQL and SimpleDB storage platforms for storing and maintaining records concerning installed applications and rewards. The database interface module 414 may receive database retrieval and storage commands from other modules in the reward system 408 and may translate these commands, in some embodiments, to appropriately interface with the storage platforms.

The deep linking module 416 may interface with a protocol handler module 406 registered on the client device 102 to insert code in the application 106. The code may facilitate the linking or redirection of users to specific events inside the application, thereby allowing the reward system to provide targeted incentives for certain pay-per-action events occurring in the application 106. For example, the deep linking module 416 may insert code in the application 106 that rewards a user for watching a video in the application 106. The deep linking module 416 may use the registered protocol handler, in essence, to open up the application 106 and allow the reward system 408 to deposit code related to pay-per-action events.

The fraud detection module 418 may detect and block fraudulent activity within the reward system 408. Fraudulent activity may be determined by monitoring certain identifiers, such as a client device IP address, a client device Udid, an AppID, and a publisher identifier. In an example embodiment, fraud is detected by determining that the same IP address is installing the same application 106 multiple times in an attempt to be rewarded for each installation of the same application. In another example embodiment, fraud may be detected by identifying the same publisher ID being passed during multiple installations for the same application. In each scenario, the fraud detection module 418 may block the offending users from the reward system 408 or otherwise prevent the offending users from being unjustly rewarded.

The communication module 420 may transmit and receive data to and from the reward system 408 to the client device 102. The communication module 420 may operate in conjunction with other modules of the reward system 408 to transmit generated referral offers, receive a ping or pushed data from an application 106 executed on the client device 102, and transmit rewards to the client device 102 upon a referral conversion.

Figure 5:
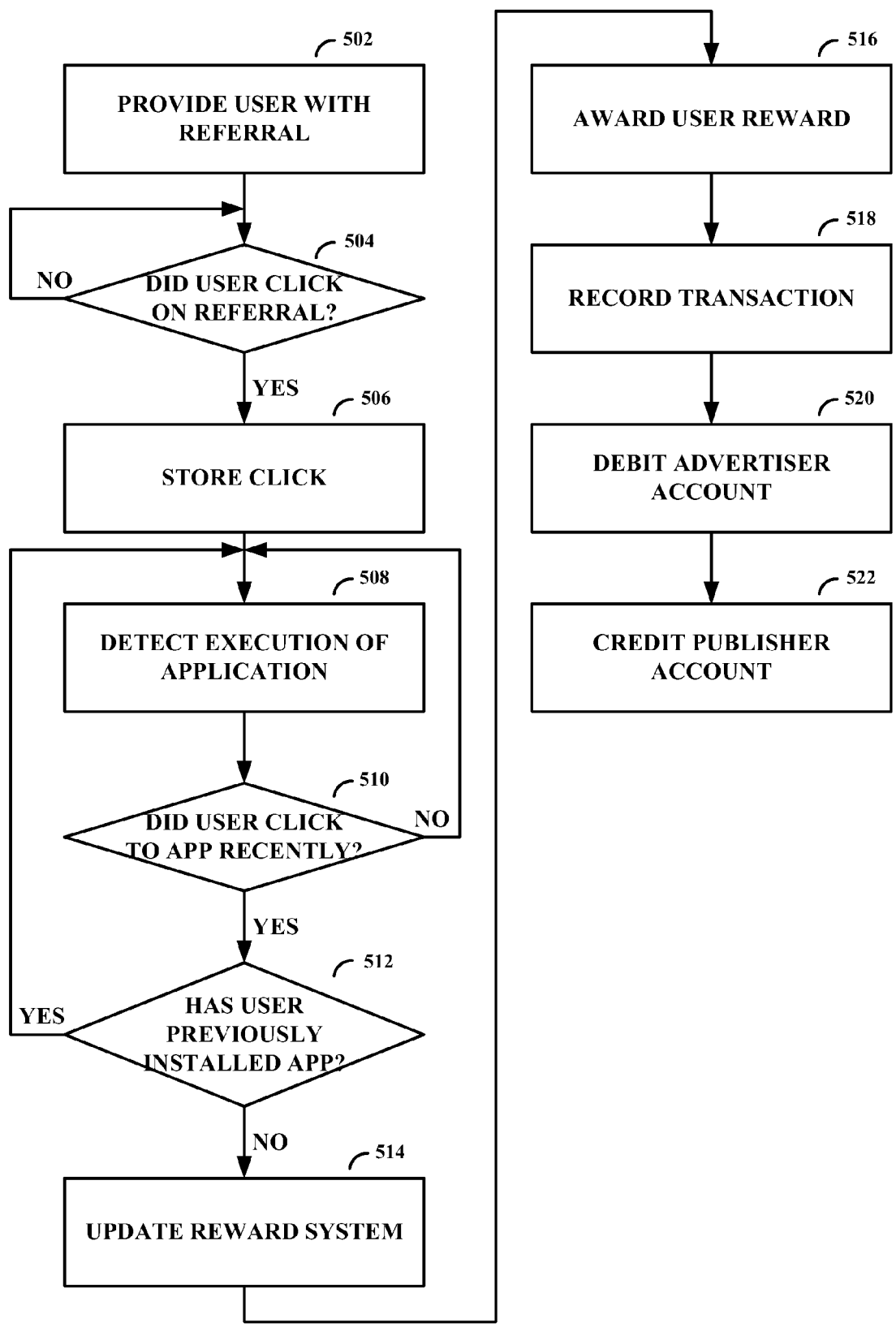
FIG. 5 is a flowchart illustrating an example method for tracking and incentivizing application installs.

FIG. 5 is a flowchart illustrating an example method for tracking and incentivizing application installs. At block 502, the reward system 408 may provide a client device 102 with a referral offer. The referral offer may be an offer to download an application from an app store in exchange for virtual currency or a virtual good.

At block 504, the reward system 408 may monitor whether the user clicked on the referral. The reward system 408 may track referral clicks using the Udid of the client device 102. If the user did not click on the referral, the example method returns to block 502.

If the user did click on the referral offer, at block 506, the reward system 408 may store the click with the client device 102's Udid. The click may be stored in a table. If the referral offer redirects the user to an app store to download an application, the AppID of the application may be stored as well in the table. Together, the Udid and the AppID may serve as a key in the table, thereby enabling easy searching for the combination of the client device 102 and application 106 when the user runs the referred application.

At block 508, the reward system 408 detects the execution of the application 106. Detection may be facilitated by the pushing of data from the client device 102 to the reward system 408. The pushing of data may be caused by code inserted into the application 106 by the reward system 408 or an advertiser that transmits a ping to the server.

At block 510, in response to detecting the execution of the referred application, the reward system 408 determines whether or not the client device 102 has clicked to the app in the app store recently. If the client device 102 is found to have clicked to the app within a predetermined amount of time, the device 102 will be adjudged to have recently downloaded the app. If the client device 102 did not recently click to the app, the example method may return to block 508 for detection of additional application executions.

At block 512, the reward system 408 determines whether or not the client device 102 has previously installed the referred application. Determination of this query may involve searching the stored click table using the client device Udid and the AppID of the referred application. If the stored click table does not contain a record of the referred application being previously installed, then in block 514, the rewards system may be updated. If the stored click table does contain a record of the referred application being previously installed, then the example method returns to block 508 to detect additional application executions.

At block 514, the reward 408 system may be updated to reflect that a referral conversion occurred. The updating may include updating the stored click table to indicate that the referred application has been installed. Further, the reward system 408 may be updated to reflect that a reward (e.g., virtual currency, virtual good) is to be awarded to the client device 102.

At block 516, the reward system 408 may transmit the reward to the user. At block 518, financial transaction data relating to the referral conversion may be recorded and stored. In an example embodiment, transaction data relating to the referral conversion may be inserted into a MoneyTransactions table. In one example embodiment, the MoneyTransactions table may be a Microsoft SQL database. At block 520, an advertiser account is debited to reflect that a user installed a referred application. At block 522, a credit is given to a publisher account.

Figure 6:
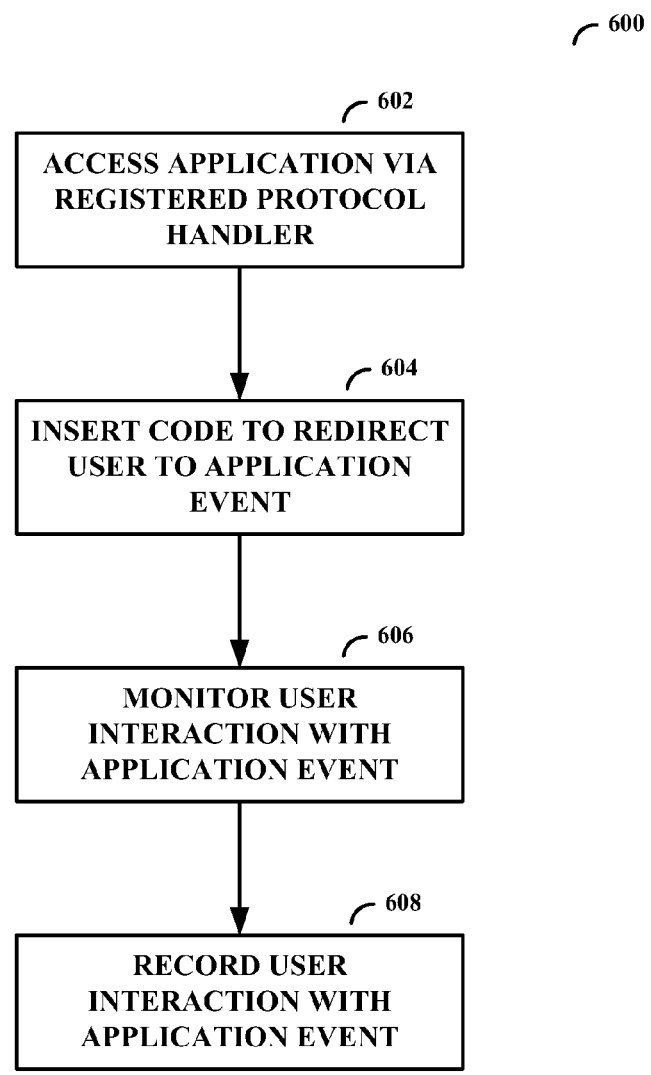
FIG. 6 is a flowchart illustrating an example method for delivering and monitoring targeted pay-per-action events occurring within an application.

FIG. 6 is a flowchart illustrating an example method for delivering and monitoring targeted pay-per-action events occurring within an application. At block 602, the reward system 408, or one of its components, may access an application via an exposed registered protocol handler. The protocol handler may be registered by a publisher of the application.

At block 604, the reward system 408 may insert code into the application using the registered protocol handler. The code may operate to redirect a user executing the application to a particular application event. For example, the user may be redirected to a particular video or survey and may be prompted to watch the video or take the survey.

At block 606, the reward system 408 may monitor user interaction with the application event. The user's interaction with the targeted pay-per-action event may be recorded in block 608. A reward or incentive offered in exchange for the user interacting with the pay-per-action application event may be logged and transmitted to the user.

Modules, Components and Logic

Certain embodiments are described herein as including logic or a number of components, modules, or mechanisms. A component or a module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component or a module mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components or modules at different times. Software may accordingly configure a processor, for example, to constitute a particular component or module at one instance of time and to constitute a different component or module at a different instance of time.

Components or modules can provide information to, and receive information from, other components or modules. Accordingly, the described components or modules may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or modules may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers. In an example embodiment, the machine-readable medium may be a non-transitory machine- or computer-readable storage medium.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 7:
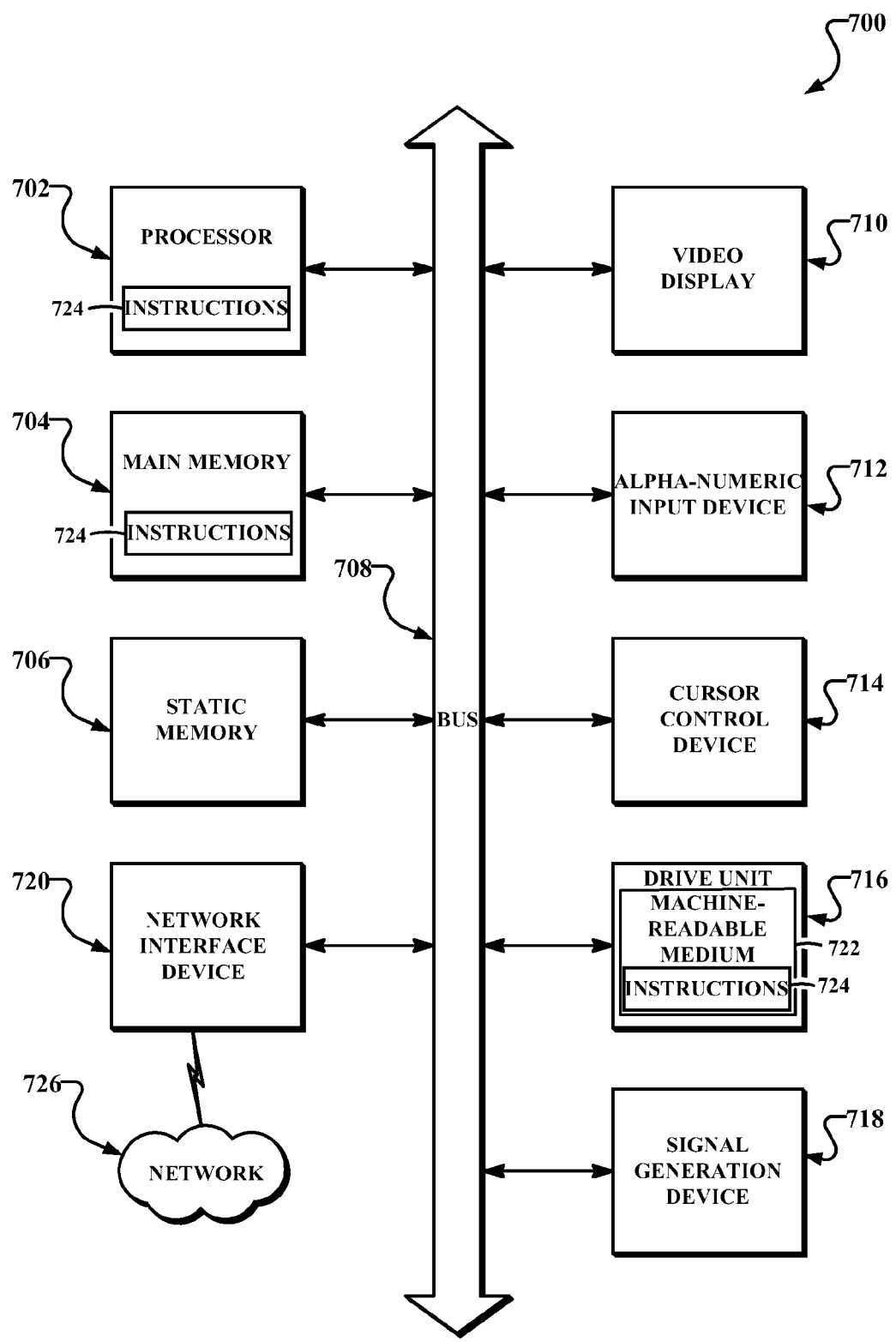
FIG. 7 illustrates a diagrammatic representation of machine in the example form of a computer system within which a set of instructions for causing the machine to perform any one or more of the methodologies discussed herein may be executed.

FIG. 7 is a block diagram of machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client device 102, 104 in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes at least one processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more data structures or instructions 724. The term "machine-readable medium" shall also be taken to include any tangible medium that is capable of storing, encoding or carrying instructions for execution by the machine and that cause the machine to perform any one or more of the methodologies disclosed herein, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions 724 for execution by the machine, and includes digital or analog communications signals or other intangible medium to facilitate communication of such software.

Example Three-Tier Software Architecture

In some embodiments, the described methods may be implemented using a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology or a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A computer-implemented method, comprising:
    transmitting a referral offer to install an application to a client device in exchange for a reward;
    detecting, by at least one processor, a selection of the referral offer;
    facilitating communication between the client device and an application server to download the application to the client device;
    detecting, by at least one processor, an execution of the application by the client device, wherein the detecting of the execution of the application comprises receiving a ping from the application executing on the client device upon the execution of the application;
    in response to detecting the execution of the application by the client device, determining the client device clicked to the application within a predetermined amount of time, wherein the client device clicked to the application prior to downloading the application;
    determining fulfillment of the referral offer based at least in part on the determination that client device clicked to the application within the predetermined amount of time; and
    in response to determining the fulfillment of the referral offer, associating reward data corresponding to the reward with at least one of the client device and an account associated with a user of the client device for a first installation of the application on the client device.

2. The method of claim 1, wherein the referral offer comprises a download link to download the application to the device, and the method further comprising storing information indicating that the client device accessed the referral offer.

3. The method of claim 1, further comprising:
    receiving a credit from an advertiser, the credit being in an advertiser account, wherein a portion of the credit is to be paid for every new application installation;
    storing financial transaction data corresponding to the associated reward data;
    debiting the advertiser account to account for the first installation of the application; and
    crediting a publisher account to account for the first installation of the application.

4. The method of claim 1, wherein the reward data is one of a virtual currency amount and a virtual good.

5. The method of claim 1, further comprising detecting fraudulent application installation activity, comprising:

monitoring multiple installations of the application using one of an Internet Protocol address, a unique device identifier of the client device, and an application identifier corresponding to the application.

6. The method of claim 1, further comprising:
re-directing a user operating the client device to an application event in the application;
monitoring interaction of the user with the application event; and
providing the user with a reward for the user interaction with the application event.

7. The method of claim 1, further comprising, based on the detecting of the execution of the application, determining an installation history of the application on the client device.

8. The method of claim 7, wherein the determining of the installation history of the application comprises searching a stored click table using a unique device identifier of the client device and an application identifier corresponding to the application.

9. The method of claim 8, wherein, based on a determination that the stored click table contains a record having the unique device identifier and the application identifier, determining that the application is not a first installation.

10. A non-transitory machine-readable storage medium storing a set of instructions that, when executed by at least one processor, causes the at least one processor to perform operations comprising:
transmitting a referral offer to install an application to a client device in exchange for a reward;
detecting, by the at least one processor, a selection of the referral offer;
facilitating communication between the client device and an application server to download the application to the client device;
detecting, by the at least one processor, an execution of the application by the client device, wherein the detecting of the execution of the application comprises receiving a ping from the application executing on the client device upon the execution of the application;
in response to detecting the execution of the application by the client device, determining the client device clicked to the application within a predetermined amount of time, wherein the client device clicked to the application prior to downloading the application;
determining fulfillment of the referral offer based at least in part on the determination that client device clicked to the application within the predetermined amount of time; and
in response to determining the fulfillment of the referral offer, associating reward data corresponding to the reward with at least one of the client device and an account associated with a user of the client device for a first installation of the application on the client device.

11. The non-transitory machine-readable storage medium of claim 10, wherein the referral offer comprises a download link to download the application to the device, and the method further comprising storing information indicating that the client device accessed the referral offer.

12. The non-transitory machine-readable storage medium of claim 10, wherein the operations further comprise:
receiving a credit from an advertiser, the credit being in an advertiser account, wherein a portion of the credit is to be paid for every new application installation;
storing financial transaction data corresponding to the associated reward data;
debiting the advertiser account to account for the first installation of the application; and
crediting a publisher account to account for the first installation of the application.

13. The non-transitory machine-readable storage medium of claim 10, wherein the reward data is one of a virtual currency amount and a virtual good.

14. The non-transitory machine-readable storage medium of claim 10, wherein the operations further comprise detecting fraudulent application installation activity, comprising:
monitoring multiple installations of the application using one of an Internet Protocol address, a unique device identifier of the client device, and an application identifier corresponding to the application.

15. The non-transitory machine-readable storage medium of claim 10, wherein the operations further comprise:
re-directing a user operating the client device to an application event in the application;
monitoring interaction of the user with the application event; and
providing the user with a reward for the user interaction with the application event.

16. The non-transitory machine-readable storage medium of claim 10, wherein the operations further comprise, based on the detecting of the execution of the application, determining an installation history of the application on the client device.

17. The non-transitory machine-readable storage medium of claim 16, wherein the determining of the installation history of the application comprises searching a stored click table using a unique device identifier of the client device and an application identifier corresponding to the application.

18. The non-transitory machine-readable storage medium of claim 17, wherein based on a determination that the stored click table contains a record having the unique device identifier and the application identifier, determining that the application is not a first installation.

* * * * *